US010320014B2

(12) United States Patent
Friesen et al.

(10) Patent No.: US 10,320,014 B2
(45) Date of Patent: Jun. 11, 2019

(54) WATER RECAPTURE/RECYCLE SYSTEM IN ELECTROCHEMICAL CELLS

(71) Applicant: NANTENERGY, INC., Scottsdale, AZ (US)

(72) Inventors: Cody A. Friesen, Fort McDowell, AZ (US); Peter Kalal, Scottsdale, AZ (US)

(73) Assignee: NANTENERGY, INC., Scottsdale, AZ (US)

( * ) Notice: Subject to any disclaimer, the term of this patent is extended or adjusted under 35 U.S.C. 154(b) by 674 days.

(21) Appl. No.: 14/176,888

(22) Filed: Feb. 10, 2014

(65) Prior Publication Data

US 2014/0227615 A1 Aug. 14, 2014

Related U.S. Application Data

(60) Provisional application No. 61/763,423, filed on Feb. 11, 2013.

(51) Int. Cl.
*H01M 8/04291* (2016.01)
*H01M 10/42* (2006.01)
(Continued)

(52) U.S. Cl.
CPC ...... *H01M 8/04291* (2013.01); *B01D 53/261* (2013.01); *B01D 53/263* (2013.01);
(Continued)

(58) Field of Classification Search
CPC .............. H01M 8/04291; H01M 8/08; H01M 8/04156; H01M 8/04171; H01M 8/083;
(Continued)

(56) References Cited

U.S. PATENT DOCUMENTS 3,363,570 A  1/1968 Scott
4,386,141 A  5/1983 Weidner et al.
(Continued)

FOREIGN PATENT DOCUMENTS

JP  2008-251491 A  10/2008
JP  2008-277315 A  11/2008
(Continued)

OTHER PUBLICATIONS

International Preliminary Report on Patentability dated Aug. 11, 2015 for Appln. No. PCT/US2014/015613.
(Continued)

*Primary Examiner* — Eli S Mekhlin
*Assistant Examiner* — Kourtney R S Carlson
(74) *Attorney, Agent, or Firm* — Pillsbury Winthrop Shaw Pittman, LLP (57) ABSTRACT

A system for managing water content in one or more electrochemical cells, each comprising a plurality of electrodes and a liquid ionically conductive medium, includes a first gas-phase conduit for receiving humid gas-phase associated with the electrochemical cell. The system also includes a desiccator unit communicated to the first air conduit and configured for extracting water from the humid gas-phase. The system additionally includes a heater for selectively heating the desiccant to selectively release extracted water from the desiccator unit. The system further includes a return conduit communicating the desiccator unit to the ionically conductive medium for receiving extracted water from the desiccator unit, and directing the extracted water to the ionically conductive medium. Other associated systems and methods are also disclosed.

28 Claims, 3 Drawing Sheets

(51) Int. Cl.

| | | |
|---|---|---|
| *B01D 53/26* | (2006.01) | |
| *H01M 8/08* | (2016.01) | |
| *H01M 8/04119* | (2016.01) | |
| *H01M 12/06* | (2006.01) | |
| *H01M 8/083* | (2016.01) | |
| *H01M 8/086* | (2016.01) | |

(52) U.S. Cl.
CPC ......... *H01M 8/04171* (2013.01); *H01M 8/08* (2013.01); *H01M 10/4207* (2013.01); *B01D 2251/404* (2013.01); *B01D 2253/102* (2013.01); *B01D 2253/104* (2013.01); *B01D 2253/106* (2013.01); *B01D 2253/11* (2013.01); *H01M 8/04156* (2013.01); *H01M 8/083* (2013.01); *H01M 8/086* (2013.01); *H01M 10/4242* (2013.01); *H01M 12/06* (2013.01)

(58) Field of Classification Search
CPC ...... H01M 8/086; H01M 8/04; B01D 53/261; B01D 53/263; B01D 2251/404; B01D 2253/102; B01D 2253/104; B01D 2253/106; B01D 2253/11; B01D 53/18
USPC .................................. 429/400–535; 96/122
See application file for complete search history.

(56) References Cited

U.S. PATENT DOCUMENTS

| | | | |
|---|---|---|---|
| 5,284,176 A | 2/1994 | Campau | |
| 5,453,334 A | 9/1995 | Melichar | |
| 6,164,309 A | 12/2000 | Brecht | |
| 6,786,226 B2 | 7/2004 | Crook et al. | |
| 7,040,431 B2 | 5/2006 | Tartamella et al. | |
| 7,556,056 B2 | 7/2009 | Hutchison | |
| 2004/0110049 A1* | 6/2004 | Shimotori ......... | H01M 8/04104 429/413 |
| 2006/0281000 A1 | 12/2006 | Sankaran | |
| 2007/0099037 A1 | 5/2007 | Senner | |
| 2007/0134527 A1* | 6/2007 | Desouza ........... | H01M 8/04291 429/450 |
| 2007/0283811 A1 | 12/2007 | Wu | |
| 2009/0087700 A1* | 4/2009 | Carlisle ............ | H01M 8/04283 429/454 |
| 2009/0233153 A1 | 9/2009 | Carlisle et al. | |
| 2009/0239131 A1 | 9/2009 | Winter | |
| 2009/0284229 A1 | 11/2009 | Friesen et al. | |
| 2010/0055508 A1 | 3/2010 | Benn | |
| 2010/0119895 A1 | 5/2010 | Friesen et al. | |
| 2010/0285375 A1 | 11/2010 | Friesen et al. | |
| 2010/0316935 A1 | 12/2010 | Friesen et al. | |
| 2011/0039181 A1 | 2/2011 | Friesen et al. | |
| 2011/0070506 A1 | 3/2011 | Friesen et al. | |
| 2011/0086278 A1 | 4/2011 | Friesen et al. | |
| 2011/0200893 A1 | 8/2011 | Friesen et al. | |
| 2011/0236730 A1 | 9/2011 | Jones | |
| 2011/0250512 A1 | 10/2011 | Friesen et al. | |
| 2011/0316485 A1 | 12/2011 | Krishnan et al. | |
| 2012/0015264 A1 | 1/2012 | Friesen et al. | |
| 2012/0068667 A1 | 3/2012 | Friesen et al. | |
| 2012/0139496 A1 | 6/2012 | Krishnan et al. | |
| 2012/0193242 A1 | 8/2012 | Marchal | |
| 2012/0202127 A1 | 8/2012 | Friesen et al. | |
| 2012/0321969 A1 | 12/2012 | Friesen et al. | |
| 2012/0321970 A1 | 12/2012 | Friesen et al. | |
| 2013/0095393 A1 | 4/2013 | Friesen et al. | |
| 2013/0115523 A1 | 5/2013 | Friesen et al. | |
| 2013/0115525 A1 | 5/2013 | Friesen et al. | |
| 2013/0115532 A1 | 5/2013 | Friesen et al. | |

FOREIGN PATENT DOCUMENTS

| | | |
|---|---|---|
| JP | 2009-529213 A | 8/2009 |
| JP | 2011-228079 A | 11/2011 |

OTHER PUBLICATIONS

Intl. Search Report/Written Opinion dated Jul. 11, 2014 of PCT/US2014/015613 filed Feb. 10, 2014 (23 pages).
European Search Report dated Aug. 31, 2016 for Appln. No. 14749407.4.
Communication under Rule 71(3) EPC, EP Application No. 14 749 407.4 dated Sep. 29, 2017.
Rejection Decision, Japanese Patent Application No. 2015-557176 dated Oct. 17, 2017 with English translation.
Office Action dated Mar. 28, 2017 in Chinese Application 201480017311.7.
Examination Report Australian Patent Application No. 2014214641 dated Jun. 26, 2017.
Second Office Action Chinese Patent Application No. 201480017311.7 dated Feb. 2, 2018 with English translation.
Notice of Allowance Japanese Patent Application No. 2015-557176 dated Mar. 13, 2018 with English translation.
Decision to Grant EP Application No. 14749407.4 dated Mar. 8, 2018.

* cited by examiner

WATER RECAPTURE/RECYCLE SYSTEM IN ELECTROCHEMICAL CELLS

CROSS-REFERENCE TO PRIOR APPLICATION

This application claims the benefit of U.S. Provisional Application Ser. No. 61/763,423, filed Feb. 11, 2013, and incorporated in its entirety herein by reference.

FIELD

The present invention is generally related to electrochemical cells, and more particularly to electrochemical cells utilizing an ionically conductive medium.

BACKGROUND

Many types of electrochemical cells utilize a liquid ionically conductive medium to support electrochemical reactions within the cell. Electrochemical cells may utilize an air breathing oxidant electrode coupled to a fuel electrode, comprising any suitable fuel. For example, a metal-air electrochemical cell system may comprise a plurality of cells, each having a fuel electrode serving as an anode at which metal fuel is oxidized, and an air breathing oxidant reduction electrode at which oxygen from ambient air is reduced. The liquid ionically conductive medium in such cells may communicate the oxidized/reduced ions between the electrodes.

In various liquid ionically conductive mediums, evaporation, electrolysis (e.g. decomposing water on recharge) or other loss of moisture from the ionically conductive medium, may be detrimental to the electrochemical cell. For example, salting of the ionically conductive medium may clog an oxidant electrode of the electrochemical cell, reducing its performance or in extreme cases, result in loss of functionality. Such salting or other failures may occur, for example, where an air-side of the oxidant electrode, or a portion thereof, is excessively dry. Additionally, a decrease in water content in the ionically conductive medium may decrease the medium's solvating capacity, i.e., its ability to dissolve solutes, or increase the percentage concentration of solutes in the medium.

Accordingly, the disclosure in the present application endeavors to facilitate maintaining desired water content in the electrochemical cell, in addition to controlling humidity associated with an air breathing oxidant electrode thereof.

While the foremost example of the present disclosure involves electrochemical cells comprising air-breathing electrodes, this is not intended to be limiting in any way. The invention may be employed in any electrochemical cell comprising a liquid ionically conductive medium. For example, aqueous flooded batteries (e.g. lead-acid, Ni—Cd) in a wide range of capacities and sizes are known in the art. Often these are vented cells comprising a vent or low pressure release valve to release oxygen and hydrogen gases formed upon decomposition of water due to electrolysis. The electrolyte lost (e.g. by evaporation and/or electrolysis) must be periodically replaced through routine maintenance. Various means of replenishing the cells with water are known in the art including manual addition, high pressure injection manual addition and single point battery watering systems. Single point battery watering systems comprise a liquid water reservoir or tank connected via tubing to a water valve assembly associated with each electrochemical cell. Such battery watering systems are well-known in the art, for example U.S. Pat. Nos. or Application Publication Nos. 4,386,141; 5,284,176; 5,453,334; 6,164,309; 6,786,226; 7,040,431 7,556,056; 2006/0281000 and 2011/0236730. Each valve assembly may comprise a mechanical level-control valve, commonly float valves, to shut off the flow of water once a predetermined electrolyte level is reached. Often, these mechanical valves may fail or stick and liquid water flows unimpeded. This is especially problematic for aqueous alkaline cells (e.g. Ni—Cd) because dried salt often clogs the valves. To avoid this, development of valves operating via high pressure bursts are known in the art. However, such high-pressure systems typically require both power and long-term reliability of a pump.

Accordingly, the disclosure in the present application provides for a passive water management system to maintain water content in any electrochemical cell comprising a liquid ionically conductive medium without the need for pumps, liquid water reservoirs and mechanical level-control valves.

SUMMARY

According to an embodiment, a system for managing water content in one or more electrochemical cells, each comprising a plurality of electrodes and a liquid ionically conductive medium, includes a first gas-phase conduit for receiving humid gas-phase associated with the electrochemical cell. The system also includes a desiccator unit communicated to the first air conduit and configured for extracting water from the humid gas-phase. The system additionally includes a heater for selectively heating the desiccant to selectively release extracted water from the desiccator unit. The system further includes a return conduit communicating the desiccator unit to the ionically conductive medium for receiving extracted water from the desiccator unit, and directing the extracted water to the ionically conductive medium.

According to another embodiment, a method for managing water content in one or more electrochemical cells, each comprising a plurality of electrodes and a liquid ionically conductive medium, includes receiving humid air from the one or more electrochemical cells in a desiccator unit. The method also includes extracting water from the humid air via the desiccator unit. The method additionally includes selectively heating the desiccator unit to selectively release extracted water from the desiccator unit. The method further includes directing the extracted water from the desiccator unit to the ionically conductive medium.

According to another embodiment, an electrochemical cell system includes an electrochemical cell comprising a fuel electrode, a liquid ionically conductive medium, an air chamber, and an oxidant reduction electrode having one surface facing the ionically conductive medium and an opposite surface facing the air chamber. The system also includes a first air conduit for receiving humid air from the air chamber of the electrochemical cell. The system additionally includes a desiccator unit communicated to the first air conduit and configured for extracting water from the humid air. The system additionally includes a heater for selectively heating the desiccator unit to selectively release extracted water from the desiccator unit. The system further includes a return conduit communicating the desiccator unit to the ionically conductive medium for receiving extracted water from the desiccator unit, and directing the extracted water to the ionically conductive medium.

According to another embodiment, a system for managing water content in a plurality of electrochemical cells, each comprising a plurality of electrodes and a liquid ionically conductive medium, includes a desiccator unit for storing water. The system also includes a heater for selectively heating the desiccator unit to selectively release water vapor from the desiccator unit. The system further includes a plurality of return conduits, each associated with a respective cell for communicating the desiccator unit to the ionically conductive medium of each cell for receiving the water vapor from the desiccator unit. Each return conduit is configured to be blocked by a rising level of the liquid ionically conductive medium, thus providing back pressure to the flow of the water vapor so that the water vapor preferentially flows to the unblocked return conduit or conduits.

According to another embodiment, a method for managing water content in a plurality of electrochemical cells, each comprising a plurality of electrodes and a liquid ionically conductive medium, includes storing water in a desiccator unit. The method also includes selectively heating the desiccator unit to selectively release water vapor from the desiccator unit. The method further includes channeling the water vapor from the desiccator unit to a plurality of return conduits, each associated with a respective electrochemical cell. Each return conduit is configured to be blocked by a rising level of the liquid ionically conductive medium, thus providing back pressure to the flow of the water vapor so that the water vapor preferentially flows to the unblocked return conduit or conduits.

Other aspects of the present invention will become apparent from the following detailed description, the accompanying drawings, and the appended claims.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

The battery water management system described in detail below is according to an embodiment wherein the electrochemical cell comprises an air-breathing oxidant electrode. According to such an embodiment, the water management system provides both functions of maintaining water content in the electrochemical cell and controlling humidity associated with the air-breathing electrode. However, it may be appreciated that a related system may be employed for electrochemical cells which do not comprise an air breathing electrode, wherein the primary function is to maintain water content within the electrochemical cell. According to such an embodiment, controlling the humidity of the air breathing electrode becomes unnecessary.

Figure 1:
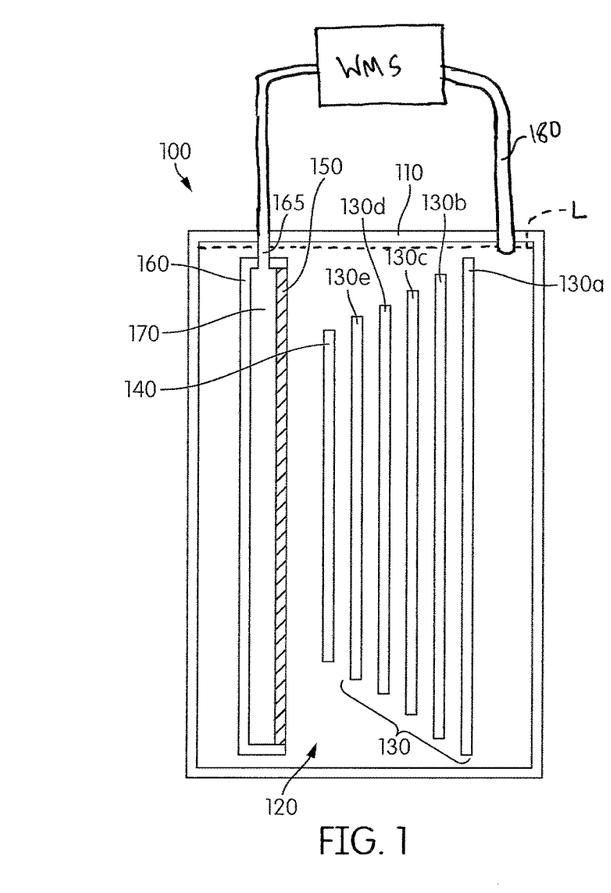
FIG. 1 schematically illustrates an embodiment of an electrochemical cell having an immersed oxidant reduction electrode configured to be coupled to a water management system.

FIG. 1 illustrates a schematic cross sectional view of an embodiment of an electrochemical cell 100. As shown, the components of the electrochemical cell 100 may be contained at least partially in an associated housing 110. The cell 100 utilizes a liquid ionically conductive medium that is contained within the housing 110, and is configured to circulate therein to conduct ions within the cell 100. While at times the ionically conductive medium may be generally stationary within the housing 110, such as in a stagnant zone or other quantity of ionically conductive medium, it may be appreciated that the cell 100 may be configured to create a convective flow of the ionically conductive medium. In some embodiments, such a flow may be generated through controlled direction of bubbles generated through electrochemical processes within the cell, through a sparger, or through any other bubble generating process. In some embodiments, the flow may be generated through any other flow generator, including but not limited to a pump. In some embodiments, localized heating causes convection of the liquid.

Various portions of the electrochemical cell 100 may be of any suitable structure or composition, including but not limited to being formed from plastic, metal, resin, or combinations thereof. Accordingly the cell 100 may be assembled in any manner, including being formed from a plurality of elements, being integrally molded, or so on. In various embodiments the cell 100 and/or the housing 110 may include elements or arrangements from one or more of U.S. patent application Ser. Nos. 12/385,217, 12/385,489, 12/549,617, 12/631,484, 12/776,962, 12/885,268, 12/901,410, 13/028,496, 13/083,929, 13/167,930, 13/185,658, 13/230,549, 13/299,167, 13/362,775, 13/526,432, 13/531,962, 13/532,374, 13/566,948, and 13/668,180, each of which are incorporated herein in their entireties by reference.

While the electrochemical cell 100 may vary across embodiments, the illustrated embodiment of FIG. 1 schematically depicts in cross section a cell chamber 120 within the housing 110. The ionically conductive medium may generally be massed within the cell chamber 120, however may flow within the cell chamber 120, or may flow through the cell chamber 120 (e.g., from one electrochemical cell 100 to another electrochemical cell 100, or from a reservoir to and from the electrochemical cell 100). A fuel electrode 130 of the cell 100 may be supported in the cell chamber 120 so as to be contacted by the ionically conductive medium. In an embodiment, the fuel electrode 130 is a metal fuel electrode that functions as an anode when the cell 100 operates in discharge (i.e., electricity generating) mode, as discussed in further detail below. As shown, in some embodiments the fuel electrode 130 may comprise a plurality of permeable electrode bodies 130a-130e. Although in the illustrated embodiment five permeable electrode bodies 130a-130e are used, in other embodiments any number is possible. Each permeable electrode body 130a-130e may include a screen that is made of any formation that is able to capture and retain, through electrodeposition, or otherwise, particles or ions of metal fuel from the ionically conductive medium that flows through or is otherwise present within the cell chamber 120. In an embodiment, electrode body 130a may be a terminal electrode body, configured such that when charging, metal fuel may generally grow on the electrode bodies 130a-e in a direction defined from electrode body 130a towards electrode body 130e. Although in the illustrated embodiment, the permeable electrode bodies 130a-130e may have different sizes so that a stepped scaffold configuration may be used, as described by U.S. patent application Ser. No. 13/167,930, and incorporated by reference above, in other embodiments the permeable electrode bodies 130a-130e may have substantially the same size.

In some embodiments, a plurality of spacers may separate the permeable electrode bodies 130a-130e so as to create flow lanes in the fuel electrode 130. Although in some embodiments the plurality of spacers may be connected to the housing 110 so that the fuel electrode 130 may be held in place relative to the housing 110, in other embodiments the spacers may be molded in between the permeable electrode bodies 130a-130e, and potentially between the fuel electrode 130 and the charging electrode 140, such that the permeable electrode bodies 130a-e (and potentially the charging electrode 140) are part of a combined electrode module. Such a configuration is depicted in U.S. patent application Ser. No. 12/901,410, published as U.S. Patent Application Publication No. 2011/0086278, incorporated by reference in its entirety above. In various embodiments, the spacers may be non-conductive and electrochemically inert so they are inactive with regard to the electrochemical reactions in the cell 100. In some embodiments, the spacers may be made from a suitable plastic material, such as polypropylene, polyethylene, polyester, noryl, ABS, fluoropolymer, epoxy, or so on. The flow lanes in the fuel electrode 130 may be three-dimensional, and have a height that is substantially equal to the height of the spacers. Although generally the spacers would be oriented vertically so as to create flow lanes that are parallel to the charging electrode generating the bubbles, in other embodiments, such as but not limited to where the top of the fuel electrode 130 is blocked, as described below, the spacers may be oriented so as to create flow lanes oriented through the permeable electrode bodies 130a-e. It should be appreciated, however, that the spacers and/or flow lanes are optional, and may be omitted in some embodiments.

In some embodiments of the cell 100, such as that illustrated, a charging electrode 140 may be positioned spaced from the fuel electrode 130, distal from the terminal electrode body 130a (i.e. proximal to the electrode body 130e). In some embodiments, the charging electrode 140 may be a portion of the fuel electrode 130 (including, for example, being one or more of the permeable electrode bodies 130b-130e). As with the fuel electrode 130, the charging electrode 140 may be positioned within the cell chamber 120, so as to be in contact with the ionically conductive medium. In the illustrated embodiment, the charging electrode 140 is in a stepped configuration similar to the permeable electrode bodies 130a-e. In other embodiments, however, the charging electrode 140 may extend at least as far as the longest of the permeable electrode bodies 130a-e, when those electrode bodies 130a-e are in a stepped scaffold configuration, or otherwise vary in size. As described in greater detail below, the charging electrode 140 may be configured to participate in the oxidation of an oxidizable oxidant species, which is present in the liquid ionically conductive medium, so as to promote the reduction of an oxidized metal fuel species and growth of the metal fuel on the fuel electrode 130 during charging of the cell 100. Accordingly, in some embodiments, the charging electrode 140 may be characterized as an oxygen evolving electrode, due to the bubbling off of oxygen gas from the charging electrode 140 during the charging of the electrochemical cell 100, as described in greater detail below.

Further shown in FIG. 1 is an oxidant reduction electrode 150, which is spaced from the fuel electrode 130 and the charging electrode 140, distal from the terminal electrode body 130a. As shown, the oxidant reduction electrode 150 may be sealed or otherwise assembled into an oxidant reduction electrode module 160 that is immersed into the ionically conductive medium in the cell chamber 120. At least one air channel 165 extends into the oxidant reduction electrode module 160, so as to provide air or another other oxidant to an air space 170 that is formed between a housing of the oxidant reduction electrode module 160 and the oxidant reduction electrode 150. It may be appreciated that the air or other oxidant in the air space 170 supplies oxidant to the oxidant reduction electrode 150. Additional details of such a configuration are described in U.S. patent application Ser. No. 13/531,962, entitled "Immersible Gaseous Oxidant Cathode for Electrochemical Cell System," and incorporated by reference in its entirety above. It may be appreciated that the air channel 165 may include a tubular or similar configuration, which may facilitate supplying oxidant to the oxidant reduction electrode 150 while allowing ionically conductive medium to pass over the oxidant reduction electrode module 160 (e.g., to either side of the air channel 165).

Although not illustrated in FIG. 1, in some embodiments the air channel 165 may include a separate air channel inlet and air channel outlet extending into and out of the air space 170 respectively, allowing for the air channel 165 to form part of an air flow path through the air space 170. The air flow path is described in greater detail below. While the air inlet and air outlet may share a common housing extending through the ionically conductive medium into the oxidant reduction electrode module 160 in some embodiments, in other embodiments the air channel 165 may include a pair of spaced air paths extending through the ionically conductive medium into the oxidant reduction electrode module 160.

As shown, in embodiments containing the separate charging electrode 140, the separate charging electrode 140 may be positioned between the oxidant reduction electrode 150 and the fuel electrode 130. In embodiments of the cell 100 lacking the separate charging electrode 140, the oxidant reduction electrode 150 may be utilized both during charging and discharging of the cell 100 (i.e. as an anode during charging and as a cathode during discharging).

Components of the cell 100, including for example, the fuel electrode 130, the permeable electrode bodies 130a-e thereof, the separate charging electrode 140, and the oxidant reduction electrode 150 may be of any suitable construction or configuration, including, for example, being constructed from one or more of Nickel or Nickel alloys (including Nickel-Cobalt, Nickel-Iron, Nickel-Copper (i.e. Monel), or superalloys), Copper or Copper alloys, brass, bronze, carbon, platinum, silver, silver-palladium, or any other suitable metal or alloy. In some embodiments, one or more components of the cell 100, such as the fuel electrode 130, the separate charging electrode 140, and the oxidant reduction electrode 150, may comprise a highly conductive material that is plated with a more degradation resistant material. For example, in some embodiments the one or more components of the cell may comprise copper that is plated with nickel, tin, silver, gold, or any other chemically compatible material. As noted above, in some embodiments the fuel electrode 130 may be formed from permeable metal screens (i.e. the permeable electrode bodies 130a-e), which may be configured to capture, retain, and provide a growth platform for the metal fuel. Likewise, in some embodiments the separate charging electrode 140 may be of a similar configuration to one of the permeable electrode bodies 130a-e. In other embodiments, the charging electrode 140 may be of another configuration, which may be configured to create a potential difference with the fuel electrode 130 so as to encourage fuel growth on the fuel electrode during charging of the electrochemical cell 100. As discussed in greater detail below, the charging electrode 140 may be configured to evolve bubbles of gaseous oxygen during the charging process, which may rise upwards in the cell 100 due to their buoyancy in the ionically conductive medium, which may drive the convective flow of the ionically conductive medium.

Like the fuel electrode 130 and the charging electrode 140, the oxidant reduction electrode 150 may too be of any appropriate construction or configuration. For example, the oxidant reduction electrode 150 may generally be configured to provide for oxygen reduction in the electrochemical cell 100, to create a potential difference with the fuel electrode 130 during discharge of the cell 100. In an embodiment, the oxidant reduction electrode 150 may contain an active layer having meshes or coatings which may be characterized as "active material(s)," that facilitate the electrochemical reactions. Accordingly, in an embodiment, the oxidant reduction electrode 150 is positioned in the cell housing 110 such that the active materials contact the ionically conductive medium such that ions may be conducted therethrough, to and/or from the fuel electrode 130. In some embodiments, the active materials may be formed by a mixture of catalyst particles or materials, conductive matrix and hydrophobic materials, sintered to form a composite material or otherwise layered together. In various embodiments the active materials may be constructed of one or more metals, such as but not limited to those listed above. In some embodiments, the active materials may include a catalyst film, which in various embodiments may be formed by techniques including but not limited to thermal spray, plasma spray, electrodeposition, or any other particle coating method.

Electrically coupled to the active materials may be a current collector, which may be configured to receive electrons from a load for consumption by the oxidant reduction reaction when the cell 100 is in a discharge mode. Likewise, the current collector may be configured to collect electrons from the oxidation reaction at the active materials (i.e. if the oxidant reduction electrode 150 serves as the charging electrode) for delivery to the power supply PS, to participate in the electrochemical reactions at the active materials, when the cell 100 is in a charging mode. The current collector may be of any appropriate construction or configuration, including but not limited to being a metal screen, which may have gaps therein. In various embodiments the current collector may be constructed of metals or alloys such as but not limited to those described above for the active layer.

Additionally included in the oxidant reduction electrode 150 may be one or more hydrophobic materials, which may be any materials that are generally gas permeable but liquid impermeable, so as to contain the ionically conductive medium within the cell housing 110, or otherwise maintain an air space associated with the oxidant reduction electrode 150 (i.e. in the oxidant reduction electrode module 160). Although hydrophobic may in some contexts be understood as "water phobic" it should be appreciated that as used herein, hydrophobic implies that it resists permeation of or repels the ionically conductive medium as a whole, and not necessarily just the water in the ionically conductive medium. As such, the hydrophobic materials may also be considered hygrophobic, or "liquid phobic," materials. The oxidant reduction electrode 150 as a whole may therefore be liquid impermeable, yet permeable to a gaseous oxidant, such that the gaseous oxidant may contact the active materials of the oxidant reduction electrode 150, so as to serve as the oxidant during the electrochemical reactions taking place during discharge of the cell 100. In various embodiments, the hydrophobic materials may be of any suitable construction or configuration that facilitates supporting the active materials thereon, be generally permeable to the gaseous oxidant, and be generally impermeable to the ionically conductive medium.

In some embodiments, the hydrophobic material or materials serve as a backing material for the active materials and/or the current collector. Although the hydrophobic materials may vary across embodiments, in some embodiments the hydrophobic materials may be constructed of or otherwise include a fluoropolymer. As an example, in various embodiments, the hydrophobic materials may comprise polytetrafluoroethylene (also known as PTFE, or Teflon®), which may in some embodiments be thermo-mechanically expanded (also known as ePTFE, or Gore-Text). In other embodiments, the hydrophobic materials may comprise Fluorinated Ethylene Propylene (also known as FEP), a fluoropolymer, or any other hydrophobic binder (e.g. polypropylene and/or polyethylene). In some embodiments, the hydrophobic materials may have a fine pore size, such as but not limited to one on the order of less than 1 micrometer, or in more particular examples, may be on the order of approximately 50 to 200 nanometers. It may be appreciated that in some embodiments the hydrophobic materials may have limited tensile strength through the thickness of the oxidant reduction electrode 150. Accordingly, in some embodiments the hydrophobic materials may be reinforced by an oxidant-permeable reinforcing layer, such as that disclosed in U.S. patent application Ser. No. 13/668,180, entitled "External PTFE Layer Reinforcement for Oxidant Electrode," incorporated in its entirety by reference above.

The fuel electrode 130 may comprise any suitable fuel. Specifically, the material selected as the metal fuel may be chemically reactive with a compatible ionically conductive medium and be more electro-positive than an active material at an opposing electrode (e.g. oxygen at an oxidant electrode in a metal-air cell). In an embodiment, a backing of the fuel electrode may be permeable to fuel in the gas, liquid or vapor states (e.g. fuel is hydrogen, hydrocarbons, alcohols). For example, in an alkaline $H_2/O_2$ fuel cell, water is generated at the fuel electrode. It may be appreciated that a portion of the moisture generated at the fuel electrode could be recirculated to the air electrode. In some such embodiments, the moisture could be separated from the fuel via desiccant absorption on discharge, and during an idle state, water could be desorbed and fed to the air electrode. In acidic fuel cells, the ionic current via protons transports from the fuel electrode to the air electrode. The protons are hydrated during this, causing electro-osmotic drag leading to a lack of water at the fuel electrode. Accordingly, moisture could be recirculated from the air electrode exit to the fuel electrode inlet, using a scheme similar to the alkaline fuel cell example outlined above.

In an embodiment, the fuel used in the cell 100 may be a metal, such as iron, zinc, aluminum, magnesium, manganese, cadmium, lead, germanium, sodium or lithium. By metal, this term is meant to encompass all elements regarded as metals or semi-metals on the periodic table, including but not limited to alkali metals, alkaline earth metals, lanthanides, actinides, post-transition and transition metals, either in atomic, molecular (including metal hydrides), or alloy form when collected on the electrode body. However, the present invention is not intended to be limited to any specific fuel, and others may be used. In an embodiment, the fuel may be provided to the cell 100 as particles suspended in the ionically conductive medium.

The ionically conductive medium may be an aqueous solution. Examples of suitable mediums include aqueous solutions comprising sulfuric acid, phosphoric acid, triflic acid, nitric acid, potassium hydroxide, sodium hydroxide, sodium chloride, potassium nitrate, or lithium chloride. In an embodiment, the ionically conductive medium may comprise an organic solvent, such as ethylene carbonate, dimethyl carbonate or other appropriate organic solvents, for example. In some embodiments, the ionically conductive medium is aqueous potassium hydroxide. In an embodiment, the ionically conductive medium may comprise an electrolyte. For example, a conventional liquid electrolyte solution may be used, or a room temperature ionic liquid may be used, as mentioned in U.S. patent application Ser. No. 12/776,962, incorporated by reference in its entirety above. In some embodiments, additives may be added to the ionically conductive medium, including but not limited to additives that enhance the electrodeposition process of the metal fuel on the fuel electrode 130, such as is described in U.S. patent application Ser. No. 13/028,496 and U.S. patent application Ser. No. 13/526,432, incorporated by reference in their entireties above. Such additives may reduce the loose dendritic growth of fuel particles, and thus the likelihood of such fuel particles separating from the fuel electrode 130, for example. In some embodiments, the ionically conductive medium may comprise any suitable separator or ion-exchange membrane, such as disclosed in U.S. patent application Ser. No. 13/526,342.

In operation of the cell 100, the fuel may be oxidized at the fuel electrode 130 when the fuel electrode 130 is operating as an anode, and an oxidizer, such as oxygen, $Cl_2$, or any other appropriate oxidizer, may be reduced at the oxidant reduction electrode 150 when the oxidant reduction electrode 150 is operating as a cathode, which is when the cell 100 is connected to a load and the cell 100 is in discharge or electricity generation mode, as discussed in further detail below. The reactions that occur during discharge mode may generate by-product precipitates, e.g., a reducible fuel species, in the ionically conductive medium. For example, in embodiments where the fuel is zinc, zinc oxide may be generated as a by-product precipitate/reducible fuel species. The oxidized zinc or other metal may also be supported by, oxidized with or solvated in the electrolyte solution, without forming a precipitate (e.g. zincate may be a dissolved reducible fuel species remaining in the fuel). During a recharge mode, which is discussed in further detail below, the reducible fuel species, e.g., zinc oxide or zincate ions, may be reversibly reduced and deposited as the fuel, e.g., zinc, onto at least a portion of the fuel electrode 130 that functions as a cathode. At the same time, either the oxidant reduction electrode 150 or the separate charging electrode 140, and/or another portion of the fuel electrode 130 functions as the anode, and oxidizes an oxidizable oxygen species (e.g., $OH^-$ ions) in the ionically conductive medium to evolve gaseous oxygen. In an embodiment, the oxidizable oxygen species may be the reduced oxidant species that was created in the cell 100 during a discharge thereof.

Although in some embodiments the oxidizer may be delivered to the oxidant reduction electrode 150 by a passive system, which may be sufficient to allow diffusion or permeation of, e.g. oxygen from the air, into the oxidant reduction electrode 150, in other embodiments different sources of the oxidizer or mechanisms for bringing the oxidizer to the oxidant reduction electrode may be utilized. For example, in an embodiment, a pump such as an air pump AP may be used to deliver the oxidizer to the oxidant reduction electrode 150 under pressure. The air pump AP may be of any suitable construction or configuration, including but not limited to being a fan or other air movement device configured to produce a constant or pulsed flow of air or other oxidant. The oxidizer source may be a contained source of oxidizer. In an embodiment, oxygen may be recycled from the electrochemical cell module 100, such as is disclosed in U.S. patent application Ser. No. 12/549,617, incorporated by reference in its entirety above. Likewise, when the oxidizer is oxygen from ambient air, the oxidizer source may be broadly regarded as the delivery mechanism, whether it is passive or active (e.g., pumps, blowers, etc.), by which the air is permitted to flow to the oxidant reduction electrode 150. Thus, the term "oxidizer source" is intended to encompass both contained oxidizers and/or arrangements for passively or actively delivering oxygen from ambient air to the oxidant reduction electrode 150. In other embodiments, the species reduced at the cathode may be stored entirely within the electrochemical cell (e.g. in lead-acid or Ni—Cd cells).

In various embodiments, the permeable electrode bodies 130a-e, the separate charging electrode 140, and the oxidant reduction electrode 150 may be connected by a switching system that may be configured to connect the cell 100 to a power supply PS, a load, or other cells 100 in series. During discharge, the fuel electrode 130 is connected to the load, and operates as an anode so that electrons given off by the metal fuel, as the fuel is oxidized at the fuel electrode 130, flows to the external load. The oxidant reduction electrode 150 functions as the cathode during discharge, and is configured to receive electrons from the external load and reduce an oxidizer that contacts the oxidant reduction electrode 150, specifically oxygen in the air surrounding the cell 100, oxygen being fed into the cell 100, or oxygen recycled from the cell 100.

The operation of the switching system may vary across embodiments, and in some embodiments the operation may be similar to those described in U.S. patent application Ser. No. 13/299,167, incorporated above by reference. As another example, in an embodiment, the external load may be coupled to some of the permeable electrode bodies 130a-130e in parallel, as described in detail in U.S. patent application Ser. No. 12/385,489, incorporated above by reference. In other embodiments, the external load may only be coupled to the terminal permeable electrode body 130a, distal from the oxidant reduction electrode 150, so that fuel consumption may occur in series from between each of the permeable electrode bodies 130a-130e. In some embodiments, the cell 100 may be configured for charge/discharge mode switching, as is described in U.S. patent application Ser. No. 12/885,268, filed on Sep. 17, 2010, previously incorporated by reference above.

In some embodiments, one or more of the electrode bodies 130a-e, the oxidant reduction electrode 150 and/or the charging electrode 140 may be interconnected by the switching system, or any other circuit, so as to selectively facilitate control of the charging and discharging of the cell 100. Switches associated with the switching system may be controlled by a controller, which may be of any suitable construction and configuration, including but not limited to, in some embodiments, conforming generally to those disclosed in U.S. application Ser. Nos. 13/083,929, 13/230,549, and 13/299,167, incorporated by reference above. In various embodiments, the control of the switches of the switching system may be determined based on a user selection, a sensor reading, or by any other input. In some embodiments, the controller may also function to manage connectivity between the load and the power source PS and a plurality of the cells 100. In some embodiments, the controller may include appropriate logic or circuitry for actuating bypass switches associated with each cell 100 in response to detecting a voltage reaching a predetermined threshold (such as drop below a predetermined threshold).

As illustrated in FIG. 1, the ionically conductive medium may be filled to a level L within the cell chamber 120. As described in greater detail below, a return inlet 180 may facilitate the addition of ionically conductive medium, or a component thereof (e.g., water) into the cell chamber 120, which may raise the level L of the ionically conductive medium. Although the cross sectional view of FIG. 1 obscures the presence of such a path, it may be appreciated that the return inlet 180, like the air channel 165, may be of a tubular configuration, configured so as to not block desired flow paths (if any) of the ionically conductive medium. Other configurations of the return inlet 180 are also possible, and may be present in various embodiments. For example, in some embodiments, the return inlet 180 may be at least partially molded into the cell housing 110. As described in greater detail below, in an embodiment at least a portion of the return inlet 180 may be configured to extend into the ionically conductive medium (e.g., into the cell chamber 120), and may help establish the level L of the ionically conductive medium. As shown in FIG. 1, a water management system WMS may be coupled between the air channel 165 and the return inlet 180, and may be configured to manage humidity levels within the air space 170, as well as recapture humidity as water, directing the water to the return inlet 180 to replenish the ionically conductive medium in the cell chamber 120. The water management system WMS is a feature of the present disclosure, and is described in greater detail below.

Although in the illustrated embodiment of FIG. 1 the cell housing 110 is configured such that the oxidant reduction electrode 150 is immersed with the oxidant reduction electrode module 160 into the cell chamber 120, it may be appreciated that in various embodiments, other configurations or arrangements of the cell 100 are also possible. For example, in FIG. 2, another embodiment of the cell 100 (specifically, cell 100*) is presented, whereby an oxidant reduction electrode 150* defines a boundary wall for the cell chamber 120, and is sealed to a portion of a housing 110* so as to prevent seepage of ionically conductive medium therebetween. Although such a configuration has concerns that a failure of the oxidant reduction electrode 150* would result in leakage of the ionically conductive medium out of the cell 100*, in some such embodiments a flow of the ionically conductive medium in the cell chamber 120 may be in a direction upwards and away from the oxidant reduction electrode 150*, across the top of the fuel electrode 130. Despite the downsides of electrochemical cells 100* having a boundary wall configuration of the oxidant reduction electrode 150*, it may be appreciated that such configurations of electrochemical cells 100* may exist, and may be retrofitted to engage the water management system WMS.

Figure 2:
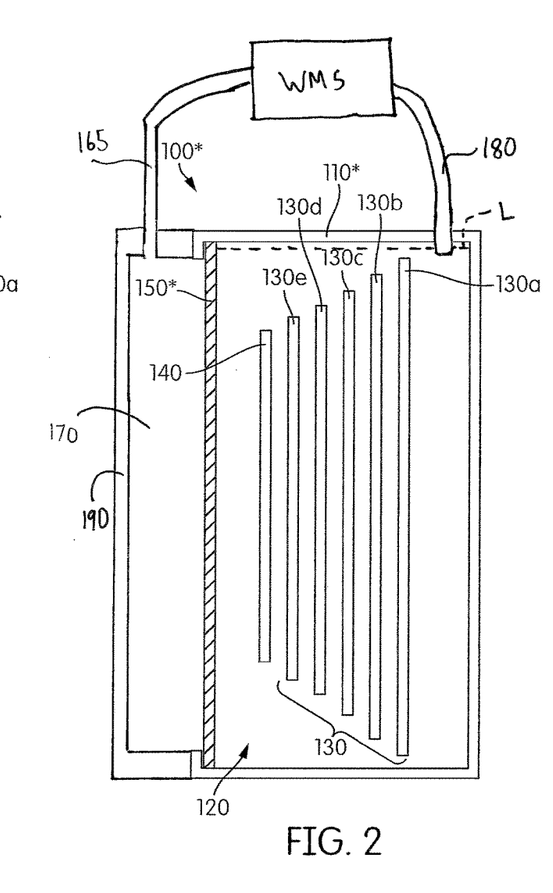
FIG. 2 schematically illustrates another embodiment of an electrochemical cell configured to be coupled to a water management system.

As shown in FIG. 2, in an embodiment such retrofitting of the electrochemical cell 100* may include surrounding the air facing side of the oxidant reduction electrode 150* by an external air chamber 190. While in the illustrated embodiment the external air chamber 190 is sealed to the cell housing 110*, in other embodiments the external air chamber 190 may be sealed to the oxidant reduction electrode 150*, or may be generally configured to generally surround the electrochemical cell 100*. Other configurations are also possible. It may further be appreciated that while the external air chamber 190 may be sealed to portions of the electrochemical cell 100* in some embodiments, in other embodiments the external air chamber 190 may more simply abut the electrochemical cell 100*, or more loosely be secured to the electrochemical cell 100*. In the illustrated embodiment, the external air chamber 190 forms an air space 170 between the oxidant reduction electrode 150* and the walls of the external air chamber 190. Similarly to the embodiment extending from the oxidant reduction electrode module 160 of FIG. 1, an air channel 165 may extend from the external air chamber 190, so as to form a path for air to flow between the air space 170 and the water management system WMS.

Figure 3:
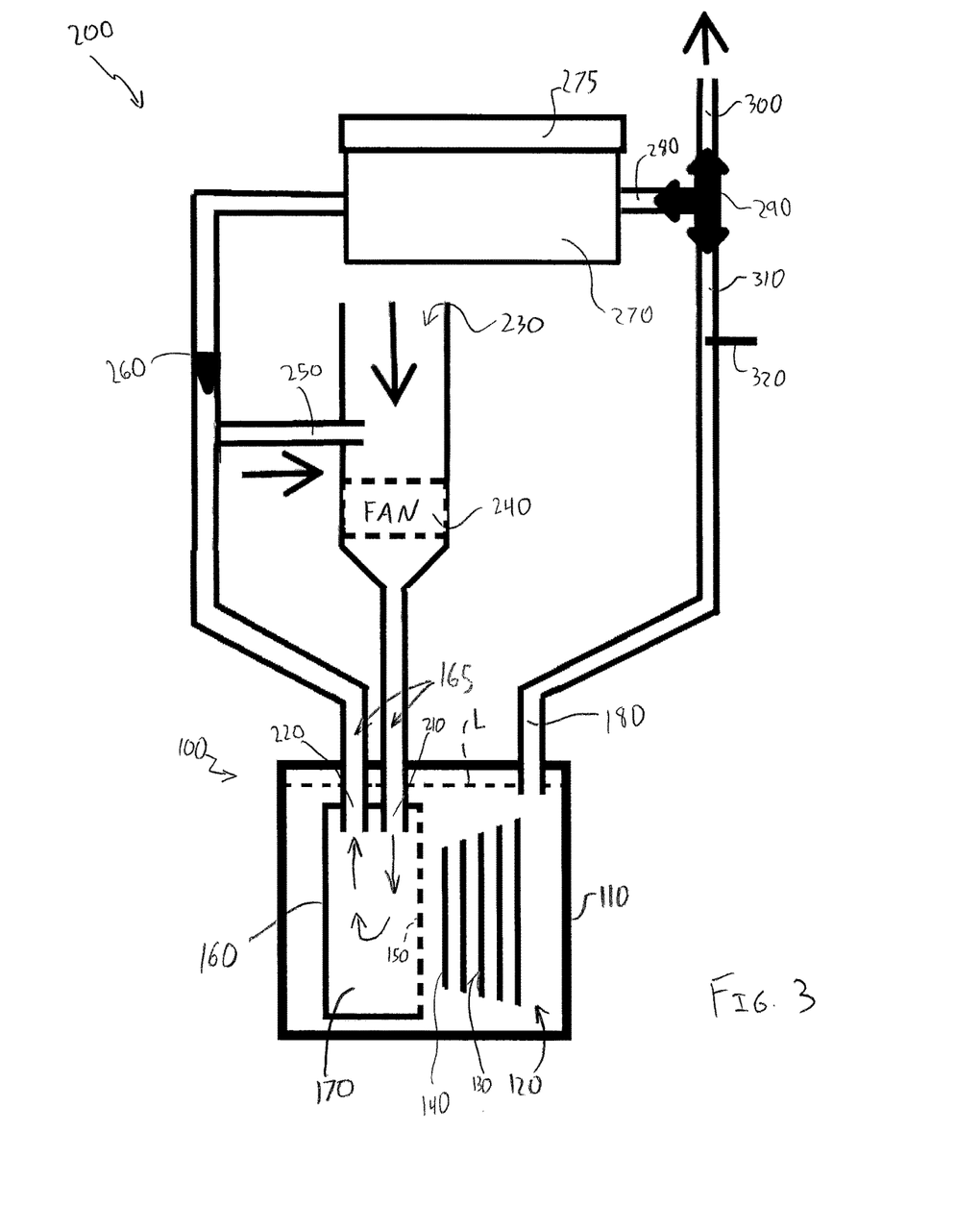
FIG. 3 illustrates an embodiment of a water management system which may be coupled to electrochemical cells such as those illustrated in FIGS. 1 and 2.

FIG. 3 schematically illustrates an embodiment of a water management system 200. It may be appreciated that the water management system 200 may be utilized as the water management WMS in the embodiments of FIGS. 1 and 2. FIG. 3 also generally illustrates a representation of the electrochemical cell 100. As shown, the cell housing 110 defines a cell chamber 120 that contains an amount of ionically conductive medium filled to the level L. The fuel electrode 130 and the separate charging electrode 140 are immersed in the ionically conductive medium. The oxidant reduction electrode 150 is also immersed in the ionically conductive medium, sealed to the oxidant reduction electrode module 160 to maintain the air space 170 therein. As shown in FIG. 3, the air channel 165 includes an air channel inlet 210 and an air channel outlet 220. As such, a flow of air comprising an oxidant may be received from an external source (e.g., ambient air, or a contained oxidant source), and may be fed into the air space 170 through the air channel inlet 210, before flowing out of the air channel outlet 220, as discussed in greater detail below. While the air channel inlet and the air channel outlet are shown to be spaced differently relative to the oxidant reduction electrode 150 in the schematic view of FIG. 3, it may be appreciated that such an illustration may be simply to schematically show movement of the flow, and the air channel inlet 210 and the air channel inlet 220 may be aligned with one another in a plane parallel to that of the oxidant reduction electrode 150 in some embodiments.

The water management system 200 of FIG. 3 may be discussed in terms of the flows of air therein. In embodiments where another gas phase is carrying the water or humidity content, it may be understood that the flow might be of the other gas phase. As shown, an air inlet 230 may receive air from outside of the electrochemical cell 100 and the water management system 200. While in some embodiments the air may be from the ambient air in the atmosphere outside of the water management system 200, in other embodiments the air may be from a contained oxidizer source (e.g., a tank of pure oxygen or an oxygen mix). In some embodiments, such as that illustrated where the air is from surrounding atmosphere, the air inlet 230 may include an air filter or other filtering structure configured to remove particulates or other contaminants from the air. Such a filter is optional, however, and may be absent in some embodiments. As shown, the water management system 200 may include a fan 240 or other air flow generator positioned to generate a flow of the air from the air inlet 230 to the air channel inlet 210 of the air channel 165 associated with the oxidant reduction electrode 150.

It may be appreciated that the air entering the air inlet 230 may be generally dry relative to air inside the air space 170. This may be because the oxidant reduction electrode 150, immersed into and in contact with the ionically conductive medium in the cell chamber 120, may be somewhat porous.

Although hygrophobic coatings and other mechanisms may attempt to prevent the ionically conductive medium from permeating the oxidant reduction electrode 150, it may be appreciated that water (e.g. water vapor) from the ionically conductive medium may still slowly pass through the oxidant reduction electrode 150, increasing the humidity of the air in the air space 170. Specifically, osmotic forces may cause water to permeate through from an ionically conductive medium contacting side of the oxidant reduction electrode 150 to an air side of the oxidant reduction electrode. Such permeation may occur more commonly when the relative humidity in the air space is low (i.e., approximately 10%).

After traversing the air space 170, and increasing in humidity from the moisture content therein, the air flow may exit the oxidant reduction electrode module 160 via the air channel outlet 220. Although the relative humidity of the air flow beyond the air channel outlet 220 may vary, in some embodiments the relative humidity leaving the air space 170 may be approximately 70%. It may be appreciated that a portion of the air flow may be redirected towards the air inlet 230 via an air recirculator 250. The air recirculator 250 connects the air channel outlet 220 back to the air channel inlet 210, such as at a point upstream of the fan 240. While in the illustrated embodiment the air recirculator 250 may direct the portion of the air flow between the air inlet 230 and the fan 240, so that some of the humid air mixes with the relatively drier air entering the air inlet 230, other configurations are alternatively possible. In some embodiments, the air recirculator 250 may be configured to increase the relative humidity of the ambient air entering the air inlet 230 to approximately 30%, for example, by mixing a portion of the humid air (e.g., at approximately 70%) with the relatively dry air (e.g., ambient air at approximately 10%). As such, the air that continues through the air channel inlet 210 into the air space 170 would have some humidity therein that is greater than the drier ambient air outside of the electrochemical cell 100 and the water management system 200.

It may be appreciated that recirculation of some of the humidity from the air space 170 may be beneficial to the performance and lifespan of the oxidant reduction electrode 150. For example, the recirculation may prevent the air in the air space 170, especially at the air channel inlet 210, from becoming too dry. Excessively dry air at the air side of the oxidant reduction electrode 150 may increase a rate at which water from the ionically conductive medium succumbs to osmotic forces and escapes through the oxidant reduction electrode 150 into the air space 170. As more water escapes, the concentration of the ionically conductive medium in the oxidant reduction electrode 150 increases. The increased concentration may further increase the osmotic pressure in the oxidant reduction electrode 150, as lower concentrated ionically conductive medium from the cell chamber 120 may try to dilute the higher concentration in the oxidant reduction electrode 150. With such an increased osmotic pressure, the oxidant reduction electrode 150 may be more susceptible to structural degradation including blistering, delamination or even rupture, which may cause loss of electrical contact and/or a leak of the ionically conductive medium that could fill the air space 170 and render the electrochemical cell 100 partially or wholly inoperative.

The remainder of the humid air exiting the air channel outlet 220 may pass through a selectively closable valve 260 into a desiccator unit 270, described in greater detail below. In an embodiment, the valve 260 may be located anywhere in the air flow path beyond where the air flow branches to the air recirculator 250, and in some embodiments the valve 260 may be located within the desiccator unit 270. In addition, the valve 260 may be of any appropriate construction or configuration, and in some embodiments may comprise a check valve or a reed valve, and may be simply configured to prevent undesired backflow. The operation of some embodiments of the valve 260 (e.g., when it is selectively opened and closed) is discussed in greater detail below.

The desiccator unit 270 may also be of any appropriate construction or configuration, and is configured to selectively capture and release water from the humid air that has passed through the valve 260. In some embodiments, the desiccator unit 270 comprises a chamber having a desiccant therein. While in an embodiment the desiccator unit 270 comprises silica gel, other hygroscopic substances may alternatively be utilized to absorb water from the humid air. For example, in some embodiments the desiccator unit 270 may comprise activated charcoal, aluminum oxide, calcium sulfate, calcium chloride, montmorillonite clay and/or a molecular sieve. Other constructions or configurations that have exothermic water adsorption and endothermic water desorption properties may additionally or alternatively be utilized. Additionally, other mechanisms for isolating humidity from the air in the desiccator unit may alternatively be utilized. As one non-limiting example, the desiccator unit may comprise a solar still, shaped to condense and isolate water from the air therein. Also, in some embodiments a passively or actively cooled condensing unit could be employed. For example, active cooling could be accomplished by a Peltier/thermoelectric element. In embodiments where the desiccator unit 270 is configured to absorb and store the water from the humid air in a desiccant, it may be appreciated that the water may be selectively released by heating the desiccant. As such, in the illustrated embodiment, the desiccator unit 270 comprises a heater 275 which may be selectively activated to heat the desiccant. While the schematic view of FIG. 3 does not show how the heated and released water/steam might flow out of the desiccator unit 270, it may be appreciated a variety of configurations are possible across embodiments, which may allow water to enter an outflow path 280. For example, the desiccator unit 270 may be shaped with an angled base leading to the outflow path 280. As another example, the heater 275 may be configured to heat the water sufficient to turn the water to steam, and direct the steam to the outflow path 280.

As shown in FIG. 3, a selector valve 290 may be configured to selectively connect the outflow path 280 to either an air outlet 300 or to a return conduit 310 that extends to the return inlet 180 of the electrochemical cell 100. It may be appreciated that the selector valve 290 of the illustrated embodiment is merely exemplary, and a plurality of valves and paths that selectively couple the desiccator unit 270 to the air outlet 300 and the return inlet 180 may be utilized in other embodiments. In some embodiments, the selector valve 290 may typically be positioned to close off the return conduit 310 to prevent evaporation of water from the cell's ionically conductive medium therethrough. The selector valve 290 may also be positioned to open the return conduit 310 and optionally close the air outlet 300 when the desiccator unit 270 is being used to release water for return to the ionically conductive medium. In some embodiments, the selector valve 290 may be configured to connect the air outlet 300 to the return inlet 180, which may facilitate utilizing the air outlet 300 as an external liquid inlet, so that a technician may utilize the air outlet 300 to pour ionically conductive medium into the cell chamber 120, or pour additional water so as to dilute a concentration of ionically conductive medium and/or to adjust desired electrolyte level.

When the selector valve 290 is opened between the outflow path 280 and the return conduit 310, it may be appreciated that a mechanism for determining when a flow of water from the desiccator unit 270 through the return conduit 310 has ceased. As discussed in greater detail below, where the release of water is facilitated by operation of the heater 275, knowing when a flow of water has ceased may allow the water management system 200 to determine that operation of the heater 275 should be terminated. Although the mechanism for determining the cessation of water flow may vary across embodiments, in the illustrated embodiment a thermocouple 320 may be positioned in the return conduit 310 so as to contact water or steam flowing through the return conduit 310. Numerous other arrangements of the thermocouple 320 are possible; for example, the thermocouple may be situated within the desiccator unit 270. In some embodiments, a plurality of thermocouples may be suitable. In the illustrated embodiment, the thermocouple 320 may detect the increased temperature of the water, heated by the heater 275, over a baseline temperature of ambient air within the return conduit 310. When the water no longer flows across the thermocouple 320, the thermocouple may detect the decrease in temperature, and turn off the heater 275 in response. In embodiments where the heater 275 is configured to turn the water in the desiccator unit 270 into steam, it may be appreciated that the steam may likewise have a higher measurable temperature than dry air, and thus the thermocouple 320 may operate in a similar manner by turning off the heater 275 when the temperature drops, indicating that water is no longer being directed back into the cell chamber 120. As described in greater detail below, the thermocouple 320 may also be coupled to a control for the selector valve 290, and may be configured to modify a configuration of the selector valve 290 once water ceases to flow, in conjunction with operating the heater 275.

It may be appreciated that the operation of the electrochemical cell 100 may modify operation of the water management system 200. Specifically, the water management system 200 may operate differently when the electrochemical cell 100 is in a discharge mode than when the electrochemical cell 100 is in a recharge mode. For example, in an embodiment when the electrochemical cell 100 is configured for discharging, a potential difference may be formed between the fuel electrode 130 and the oxidant electrode 150, such that the metal fuel on the fuel electrode 130 is being oxidized, while an oxidant (e.g., the oxygen in the air being received in the air inlet 230) is being reduced at the oxidant reduction electrode 150. As humidity is being transferred into the air flow passing through the air space 170, the valve 260 may be open so that the air flow exiting the air channel outlet 220 may enter the desiccator unit 270. As noted above, it may be appreciated that some of the humid air would be recirculated via the air recirculator 250. In some embodiments, air recirculator 250 comprises an adjustable valve. For example, an air recirculator valve may be adjusted depending on local climate, (e.g. relative humidity) or any other suitable metric. In some embodiments, it may be appreciated that the selector valve 290 may be opened to the atmosphere (e.g., the outflow path 280 is open to the air outlet 300, so that as the humidity is being absorbed from the humid air in the desiccator unit 270, the dried air may vent to the atmosphere. The desiccator unit 270 may therefore absorb moisture originally from the ionically conductive medium that would otherwise escape to the atmosphere through the oxidant reduction electrode 150, causing evaporation, and thus increased concentration, of the ionically conductive medium.

When the electrochemical cell 100 is in a recharge mode, oxygen ions may be oxidized to evolve gaseous oxygen the separate charging electrode 140 and/or a portion of the fuel electrode 130, while fuel ions may be reduced at least at another portion of the fuel electrode 130, to plate metal fuel on at least that other portion of the fuel electrode 130. In an embodiment, during the recharge mode the valve 260 may be closed (as the oxidant reduction electrode 150 may be idle), and the heater 275 may be heating the desiccator unit 270 to release water therefrom. It may be appreciated that by closing the valve 260, water from the desiccator unit 270 may be prevented from being released (e.g., as steam) out of the air recirculator 250 and/or the air inlet 230. Accordingly, during the heating by the heater 275, the selector valve 290 may be closed to the atmosphere (and the air outlet 300), and instead may be open between the outflow path 280 and the return conduit 310. As such, the heated water may be directed through the return conduit 310 to the return inlet 180, condensing on the surface of the ionically conductive medium, or otherwise recombining with the ionically conductive medium. As indicated above, when the heated water (e.g., steam) ceases passing the return conduit 310, as ascertained by the thermocouple 320, it may be understood that the moisture absorbed in the desiccator unit 270 has been released back into the ionically conductive medium, and the heater 275 may be deactivated.

Figure 4:
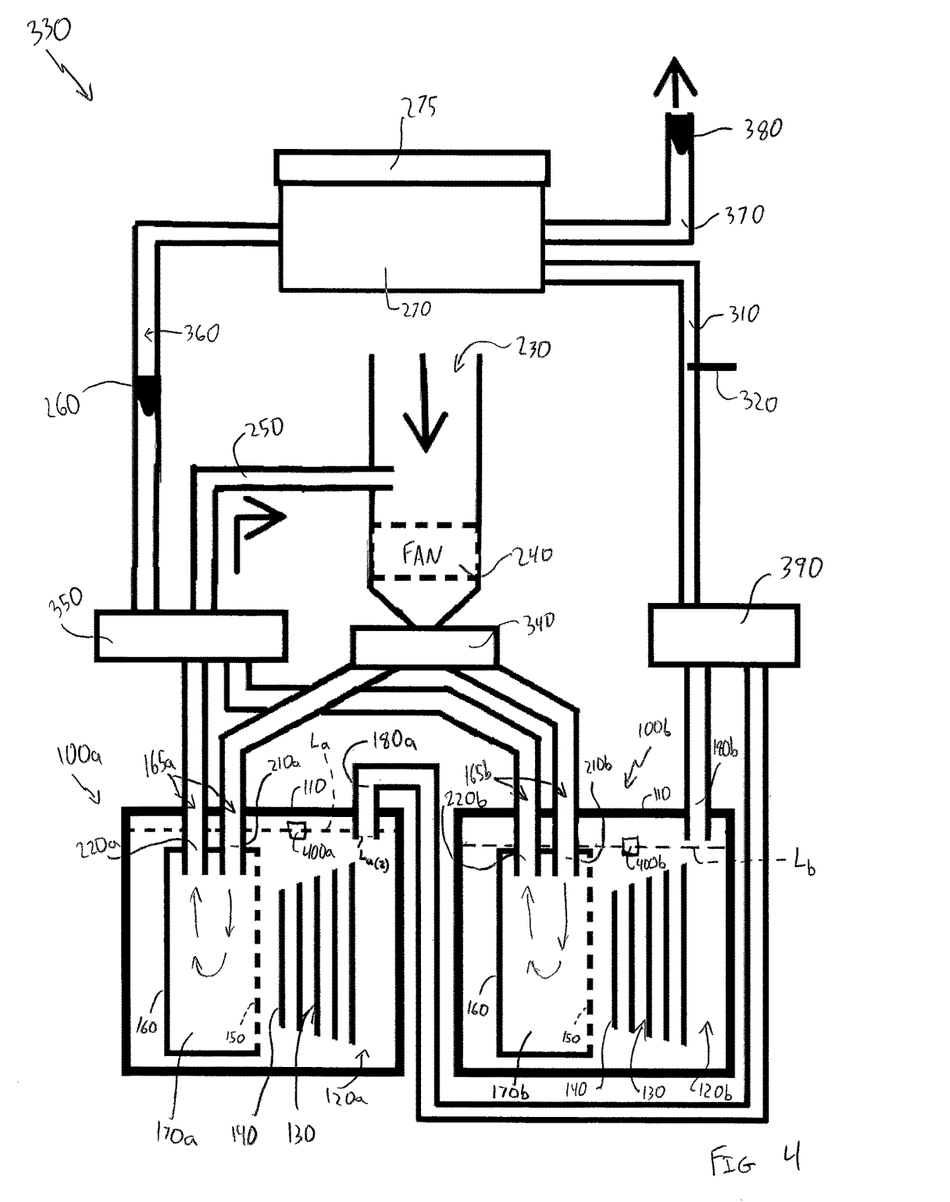
FIG. 4 schematically illustrates an electrochemical cell system including a plurality of electrochemical cells coupled by a common water management system.

In some embodiments, multiple electrochemical cells may share a common water management system. It may be appreciated that such a water management system may be configured so as to ensure that each of the electrochemical cells associated therewith maintain desired amounts of ionically conductive medium therein. For example, FIG. 4 schematically illustrates a water management system 330 configured for use with both electrochemical cell 100a and electrochemical cell 100b. As discussed below, it may be appreciated that additional electrochemical cells 100 may be utilized in other embodiments. Further, other electrochemical cells (e.g., electrochemical cells 100*) may additionally or alternatively be utilized in other embodiments. It may be appreciated that components of the water management system 330 may be generally similar to those utilized in the water management system 200, and as such, like elements may be labeled similarly. For example, as discussed in greater detail below, it may be appreciated that the air inlet 230, the fan 240, the valve 260, the desiccator unit 270, the heater 275, and the thermocouple 320 may perform similar functions and be of similar configurations to those discussed above in water management system 200.

In the illustrated embodiment, both electrochemical cell 100a and electrochemical cell 100b are configured with fuel electrodes 130, and charging electrodes 140 immersed in ionically conductive medium in cell chambers 120, that are defined by cell housings 110. To differentiate the cell chambers 120, the cell chamber 120a is associated with electrochemical cell 100a, while the cell chamber 120b is associated with electrochemical cell 100b. As further shown, oxidant reduction electrodes 150 are immersed in the ionically conductive medium, and are sealed to oxidant reduction electrode modules 160, which are configured to maintain air spaces 170 therein. To differentiate the air spaces 170, air space 170a is found in electrochemical cell 100a, while air space 170b is found in electrochemical cell 100b. Further, the air spaces 170a and 170b are associated with air channels 165*a* and 165*b* extending into and out of electrochemical cells 100*a* and 100*b* respectively.

Similarly to water management system 200, the water management system 330 may be configured to receive air comprising an oxidant via the air inlet 230. A flow of the air may be generated by the fan 240, which may be directed to each of the electrochemical cells 100*a*-*b*. As shown in FIG. 4, in an embodiment the air flow may be distributed by an inlet air manifold 340. While the schematically illustrated inlet air manifold 340 is configured to distribute the air flows to air channel inlets 210*a* and 210*b* of the air channels 165*a* and 165*b* respectively, in other embodiments additional cells may also receive inflows of air from the inlet air manifold 340. After passing through the air channel inlets 210*a* and 210*b*, the air flows may absorb moisture in the air spaces 170*a* and 170*b*, and exit the immersed oxidant electrode modules 160 via the air channel outlets 220*a* and 220*b* respectively. As shown, in an embodiment the air flows of the humid air may recombine at an exit air manifold 350 of the water management system 330. While the exit air manifold 350 of the illustrated embodiment couples to electrochemical cells 100*a* and 100*b*, additional electrochemical cells 100 (or other configurations of electrochemical cells) may additionally or alternatively be coupled to the exit air manifold 350 in other embodiments.

In some embodiments, such as that illustrated in FIG. 4, the air recirculator 250 may be a separate line extending from the exit air manifold 350. It may be appreciated that such a configuration may decrease a pressure buildup associated with the air flows. Again, the air recirculator 250 may direct some of the humid air back towards the air inlet 230, so as to prevent the air in the air spaces 170*a* and 170*b* from becoming excessively dry. A main humid air channel 360 may therefore extend between the exit air manifold 350 and the desiccator unit 270, and may facilitate capture of the moisture from the humid air received from the exit air manifold 350 by the desiccator unit 270. As shown, the valve 260 preventing backflows of steam when the heater 275 is heating the desiccator unit 270 may be located in the main humid air channel 360 in some embodiments.

In the illustrated embodiment of the water management system 330, separate flow paths extend from the desiccator unit 270, instead of the selector valve 290 associated with the common outflow path 280 (as found in the embodiment of the water management system 200). Specifically, an air outflow path 370, having an associated air outflow valve 380, may facilitate selective release of dry/spent air (e.g., when the electrochemical cell is operating in a discharge mode). Additionally, the return conduit 310 extends directly from the desiccator unit 270 to a vapor distribution manifold 390. As shown, the vapor distribution manifold 390 may couple to the return inlets 180 (individually, the return inlet 180*a* associated with electrochemical cell 100*a*, and the return inlet 180*b* associated with the electrochemical cell 100*b*), to facilitate the return of the captured water back into the cell chambers 120*a* and 120*b* respectively. While the vapor distribution manifold 390 of the illustrated embodiment couples to electrochemical cells 100*a* and 100*b*, additional electrochemical cells 100 (or other configurations of electrochemical cells) may additionally or alternatively be coupled to the vapor distribution manifold 390 in other embodiments. Additionally, while the flow path between the vapor distribution manifold 390 and the return inlet 180*a* of the electrochemical cell 100*a* is shown as a tortuous route between the electrochemical cells 100*a* and 100*b*, it may be appreciated that this is a schematic representation to simplify the illustrated connection, and is not intended to be limiting in any way.

Similarly to the water management system 200, it may be appreciated that in some embodiments the water management system 330 may be configured to vary in operation depending on whether the electrochemical cells 100 are in charge mode or discharge mode. In some embodiments, the electrochemical cells 100 may be configured to each be in a charge mode at a same time, so that the water management system 330 may vary in operation to cooperate with the set of electrochemical cells 100. In some embodiments, the water management system 330 may include additional valves associated with each of the electrochemical cells 100, which may individually be controlled to open and close to facilitate charge mode operation and discharge mode operation in the water management system 330 for each of the electrochemical cells 100.

In an embodiment, when the electrochemical cells 100 are in a discharge mode, air may enter the air inlet 230, and a flow may be generated through the fan 240. The flow may be divided by the inlet air manifold 340, so as to establish an air flow to the air space 170*a* and the air space 170*b* respectively. After gaining humidity therein, the air flow may exit the air channel outlets 220*a* and 220*b*, and recombine at the exit air manifold 350. A portion of the humid air may be recirculated to the air inlet 230 by the air recirculator 250, while the remainder of the humid air may pass through the main humid air channel 360 (and the valve 260), into the desiccator unit 270. The humidity may be absorbed from the air flow in the desiccator unit 270, and the dried air may exit through the air outflow path 370 (with the air outflow valve 380 opened to allow venting of the dried flow into the atmosphere).

During a charging or idle state of the electrochemical cells 100, the heater 275 may be activated to free water absorbed in the desiccator unit 270. During heating, the valve 260 may be closed to prevent a flow of water or vapor back into the air spaces 170*a* and 170*b*, and the air outflow valve 370 may be closed to prevent venting of water or vapor out of the water management system 330 and the electrochemical cells 100. The closure of the valve 260 may be automatic where the valve 260 is a one-way valve configured to prevent backflow (e.g., a reed valve). As the desiccator unit 270 is heated, water vapor may proceed through the return conduit 310 and the vapor distribution manifold 390, towards the return inlets 180*a* and 180*b* associated with each of the electrochemical cell 100. Again, heating by the heater 275 may cease once the thermocouple 320, or another sensor, determines that no more water is proceeding through the return conduit 310 back toward the cell chambers 120*a* and 120*b*, as discussed in greater detail below.

In some embodiments, charging of the electrochemical cells 100 may be configured to disengage the fan 240, while in other embodiments the fan 240 may remain engaged to cycle the humid air through the air recirculator 250. In some embodiments, the operation of the fan 240 may be pulsed or otherwise intermittent, while in other embodiments the fan 240 may operate continuously. Further, operation of the fan 240 may be controlled through timing circuits, control logic associated with the electrochemical cells 100 (or a man controller associated therewith), and/or through sensors associated with the water management system 330. Other configurations are also possible in other embodiments.

As indicated above, during charging (or an idle state) of the electrochemical cells 100, the heater 275 may be activated so as to release water vapor towards the return inlets

180*a* and 180*b*. In an embodiment, e.g., with the increased temperature in the closed system of the water management system 330, the released water may be pressurized. The released water, under pressure, may then be directed through the return conduit 310 towards the electrochemical cells 100. It may be appreciated that in some embodiments the return inlets 180*a* and 180*b* may facilitate self-leveling of the ionically conductive medium. For example, in an embodiment where the heater 275 is configured to release the water from the desiccator unit 270 in vapor form, it may be appreciated that the water vapor, prevented from backflow by the valve 260, and escaping the water management system to the outside air by the air outlet valve 380, would be forced to flow through the return conduit 310 towards the return inlets 180*a* and 180*b*. It may be appreciated that in some embodiments, no valves are utilized between the desiccator unit 270 and the electrochemical cells 100, as flow of water in vapor/steam form is balanced through regulation of pressure heads at the return inlets 180*a* and 180*b*. As indicated above, where the return inlets 180*a* and 180*b* extend into the cell chambers 120*a* and 120*b* respectively, the amount of the extension may define a desired minimum level for the ionically conductive medium. Accordingly, where the level of the ionically conductive medium is sufficient to close the return inlets 180*a* and 180*b*, then the water vapor may create a head pressure and some back pressure where it meets the ionically conductive medium. Back pressure at one electrochemical cell 100 may cause backflow of the water vapor to another electrochemical cell 100, which may have a level of ionically conductive medium that is below the level established by the return inlet 180. As such, the vapor would condense at the other electrochemical cell 100, refilling that cell chamber 120 instead of overfilling the cell chamber 120 of the electrochemical cell 100 that has sufficient ionically conductive medium.

The self-leveling feature of the water management system 330 may be appreciated with reference to the electrochemical cells 100*a* and 100*b* illustrated in FIG. 4. As shown, a level $L_a$ of ionically conductive medium in the electrochemical cell 100*a* is higher relative to a level $L_b$ of ionically conductive medium in the electrochemical cell 100*b*. In particular, the level $L_b$ of ionically conductive medium in the electrochemical cell 100*b* is below the return inlet 180*b*, while the level $L_a$ of ionically conductive medium in the electrochemical cell 100*a* is at or above the furthest extent of the return inlet 180*a*. As such, the water vapor generated by the heater 275 traversing along the return inlet 180*a* may cause head pressure and back pressure where it meets the ionically conductive medium. As shown, while the head pressure may establish a level $L_{a(2)}$ of ionically conductive medium within the return inlet 180*a*, associated back pressure would result in the water vapor preferentially traversing the path of least resistance (e.g., the return inlet 180*b*), and condensing in the cell chamber 120*b* to raise the level $L_b$. Accordingly, the head pressures and back pressures associated with cell chambers 120 having at least a minimum desired level of ionically conductive medium would not cause those electrochemical cells 100 to overflow, but rather would fill cell chambers 120 having less than the minimum desired level of ionically conductive medium, to achieve self-leveling across a plurality of electrochemical cells 100.

It may be appreciated that in some embodiments, the electrochemical cells 100 may contain therein level sensors 400 (individually level sensors 400*a* and 400*b*) configured to ascertain a level of the ionically conductive medium. The level sensors 400*a* and 400*b* may be of any construction or configuration, including but not limited to a buoyancy/float sensor, an optical sensor, a thermal sensor, conductivity sensor or so on. In an embodiment, when the ionically conductive medium drops below a desired level for one or more of the electrochemical cells, the heater 275 may be activated (with the valves 260 and 380 closed), to release water from the desiccator unit 270. In other embodiments, refilling may be automatic, based on timer circuits or similar control mechanisms. In some embodiments, sensors associated with the desiccator unit 270 may determine when to activate the heater 275. As one non-limiting example, if a sensor determines that the desiccant is completely saturated, however a humidity level within the desiccator unit 270 rises (indicating that additional water is unable to be absorbed in the desiccant), the heater 275 may vaporize the water to attempt to replenish the cell chambers 120. Other configurations are also possible, and may vary across embodiments.

In some embodiments, it may be appreciated that the desiccator unit 270 may selectively open to the atmosphere, so that the desiccator unit 270 may capture and retain atmospheric moisture, or may be configured to receive air from some other external source, rather than from the air leaving the air channel from the cell. For example, this arrangement may be more suitable for electrochemical cells which do not comprise an air breathing electrode. In embodiments such as that described above, where the water management system 200 or 330 is configured to extract water from the electrochemical cells 100, the desiccator unit 270 may selectively close off a path from the air channel outlets 220 of the electrochemical cells 100 (e.g., by closing the valve 260) so that humid air from the air channel outlets 220 is not inadvertently lost to the atmosphere when the desiccator unit 270 is extracting humid air from the atmosphere. In an embodiment, the opening to the atmosphere may similarly be closed off via the valve 260, or another valve, when the heater 275 is heating the desiccator unit 270 to release the extracted water, so that the extracted water is directed through the return conduit 310. It may be appreciated that in some embodiments water management systems, such as the water management system 200 or 330, might not be generally configured to capture the humidity from the electrochemical cells 100. In some such embodiments, the opening to the atmosphere (or other external source) might be the main or sole source of humid air for the desiccator unit 270 to capture humidity for subsequent release into the electrochemical cells 100. It may be appreciated that in some such embodiments, the humid air may simply remain in the air spaces 170, may be circulated through the air recirculator 250, or may be otherwise vented to the atmosphere.

The structures, constructions, and configurations described herein are exemplary, and may be varied across embodiments. In some embodiments, the valves are passive, requiring no external control for operation. In some embodiments, active valves having an external means of actuation may be employed. For example, the valves utilized herein may be of any appropriate configuration, including but not limited to three-way valves, reed valves, bimetal snap check valves, or so on. The valves may be activated through any appropriate source, including but not limited to servos, electronic controllers, heat (e.g., from the heater 275) or pressure (e.g., from the air flow generated by the fan 240 or from pressure associated with the heated water vapor). Additionally, the manifolds, pipes, tubes, connections, or other air/water flow paths may be of any appropriate construction or configuration, including but not limited to metal, plastic, and/or rubber. Other components of the electrochemical cells (e.g., electrochemical cell 100) or the water management systems (e.g., water management system 330) may similarly be of varied constructions or configurations.

The foregoing illustrated embodiments have been provided solely for illustrating the structural and functional principles of the present invention and are not intended to be limiting. For example, the present invention may be practiced using different fuels, different oxidizers, different electrolytes, and/or different overall structural configuration or materials. Thus, the present invention is intended to encompass all modifications, substitutions, alterations, and equivalents within the spirit and scope of the following appended claims.

What is claimed is:

1. A method for managing water content in one or more electrochemical cells, each electrochemical cell comprising a plurality of electrodes and an aqueous ionically conductive medium, the aqueous ionically conductive medium being contained at a level within a housing, the method comprising:
   receiving humid air exiting from the one or more electrochemical cells in a desiccator unit;
   extracting water from the humid air via the desiccator unit;
   selectively heating the desiccator unit to selectively release extracted water from the desiccator unit; and
   directing the extracted water from the desiccator unit into the housing containing the aqueous ionically conductive medium of at least one of the electrochemical cells,
   wherein the electrochemical cell comprises a fuel electrode, an air chamber, and an oxidant reduction electrode having one surface facing the aqueous ionically conductive medium and an opposite surface facing the air chamber;
   wherein the fuel electrode is immersed in the aqueous ionically conductive medium, and
   wherein the humid air is received from an air chamber of the one or more electrochemical cells.

2. The method of claim 1, further comprising generating a flow of the humid air to the desiccator unit.

3. The method of claim 2, wherein said flow is generated with a fan.

4. The method of claim 1, further comprising receiving ambient air from outside the one or more electrochemical cells into the air chamber.

5. The method of claim 1, further comprising recirculating a portion of the humid air, mixed with the ambient air as mixed air, such that the mixed air is returned to the air chamber.

6. The method of claim 1, further comprising preventing extracted water from the desiccator unit from returning to the air chamber.

7. The method of claim 1, further comprising selectively permitting an outflow of dry air from the desiccator unit after water has been extracted from the humid air by the desiccator unit by utilizing a valve associated with an air outlet.

8. The method of claim 7, wherein the valve associated with the air outlet comprises a three way valve movable between a first position coupling the desiccator unit with the air outlet, and a second position coupling the desiccator unit with the aqueous ionically conductive medium.

9. The method of claim 1, further comprising sensing the level of the aqueous ionically conductive medium with a level sensor.

10. The method of claim 9, further comprising activating the heater when said sensing the level of the aqueous ionically conductive medium indicates a lower than desired level of the ionically conductive medium, such that the directing of the extracted water from the desiccator unit into the housing comprises raising the level of aqueous ionically conductive medium contained within the housing of the at least one of the electrochemical cells.

11. The method of claim 9, further comprising sensing a flow of the extracted water from the desiccator unit to the aqueous ionically conductive medium, and deactivating the heater when the flow of extracted water ends.

12. The method of claim 11, wherein sensing the flow of the extracted water comprises utilizing a thermocouple.

13. The method of claim 1, further comprising, during discharge of the one or more electrochemical cells, opening a valve between the desiccator unit and an air outlet to permit outflowing of dry air from the desiccator unit after the extracting water from the humid air.

14. The method of claim 1, further comprising, during discharge of the one or more electrochemical cells, opening a valve between the air chamber and the desiccator unit to enable said receiving the humid air.

15. The method of claim 14, further comprising a generating a flow of the humid air from the air chamber to the desiccator unit during discharge, the flow being generated via a fan coupled to an air inlet configured to receive ambient air from outside the one or more electrochemical cells.

16. The method of claim 15, further comprising diverting a portion of the humid air from the air chamber to the air inlet, and recirculating the portion of the humid air within the air chamber after said diverting.

17. The method of claim 16, further comprising controlling the valve between the air chamber and the desiccator unit, the valve between the desiccator unit and the air outlet, and the fan to maintain a relative humidity in the air chamber of approximately 30-80%.

18. The method of claim 1, further comprising closing the desiccator unit to the atmosphere during charging of the one or more electrochemical cells.

19. The method of claim 1, further comprising closing the desiccator unit to the atmosphere during charging of the one or more electrochemical cells wherein said closing the desiccator unit to the atmosphere comprises closing the desiccator unit to the air chamber.

20. The method of claim 1, wherein the extracted water is in the form of water vapor.

21. The method of claim 1, wherein said extracting water from the humid air via the desiccator unit comprises exposing the humid air to a desiccant.

22. The method of claim 21, wherein the desiccant comprises one or more of silica gel, activated charcoal, aluminum oxide, calcium sulfate, calcium chloride, montmorillonite clay, and molecular sieves.

23. The method of claim 1, where directing the extracted water from the desiccator unit comprises distributing the extracted water to a plurality of the one or more electrochemical cells.

24. The method of claim 23, wherein a pressure head associated with the extracted water causes the extracted water to refill the aqueous ionically conductive medium of a first electrochemical cell of the one or more electrochemical cells having a lower level of the aqueous ionically conductive medium before refilling the aqueous ionically conductive medium of a second electrochemical cell of the one or more electrochemical cells having a higher level of the aqueous ionically conductive medium.

25. The method of claim 24, further comprising a manifold associated with the return conduit configured to couple the desiccator unit to a plurality of the one or more electrochemical cells, wherein return inlets extending into first electrochemical cell and the second electrochemical cell from the manifold define respective set levels for the aqueous ionically conductive medium for each of the first electrochemical cell and the second electrochemical cell; and wherein when the aqueous ionically conductive medium of the second electrochemical cell is at or above the respective set level for the second electrochemical cell, and the aqueous ionically conductive medium of the first electrochemical cell is below the respective set level for the first electrochemical cell, the pressure head causes back pressure at an intersection of the return inlet of the second electrochemical cell and the aqueous ionically conductive medium of the second electrochemical cell, such that said directing causes the extracted water to flow to the return inlet of the first electrochemical cell, and fill the aqueous ionically conductive medium of the first electrochemical cell to the respective set level of the first electrochemical cell.

26. The method of claim 25, wherein the respective set level for the first electrochemical cell is the same as the respective set level for the second electrochemical cell.

27. The method of claim 1, wherein the oxidant reduction electrode is mounted to a module immersed in the aqueous ionically conductive medium, the module defining the air chamber.

28. A method for managing water content in a plurality of electrochemical cells, each electrochemical cell comprising a plurality of electrodes including a fuel electrode and an oxidant reduction electrode and an aqueous ionically conductive medium contained at a level within a housing, the method comprising:

storing water in a desiccator unit;

selectively heating the desiccator unit to selectively release water vapor from the desiccator unit; and channeling the water vapor from the desiccator unit to a plurality of return conduits, each associated with a respective electrochemical cell;

wherein each return conduit is configured to be blocked by a rising level of the aqueous ionically conductive medium within the housing, thus providing back pressure to the flow of the water vapor so that the water vapor preferentially flows to the unblocked return conduit or conduits, and wherein the electrochemical cell further comprises an air chamber, wherein the oxidant surface facing the air chamber, and the fuel electrode is immersed in the aqueous ionically conductive medium.

* * * * *